United States Patent [19]

Burriat et al.

[11] Patent Number: 4,659,476
[45] Date of Patent: Apr. 21, 1987

[54] METHOD FOR THE TREATMENT OF LIQUIDS ON GRANULAR MATERIALS

[75] Inventors: Jean Burriat, Clamart; Bernard Causse, Paris; Jean-Marie Rovel, Rueil Malmaison, all of France

[73] Assignee: Degremont, Rueil Malmaison, France

[21] Appl. No.: 797,813

[22] Filed: Nov. 13, 1985

[30] Foreign Application Priority Data

Nov. 28, 1984 [FR] France .................... 84 18108

[51] Int. Cl.⁴ .............................................. B01J 49/00
[52] U.S. Cl. ...................................... 210/675; 210/678
[58] Field of Search ............... 210/675, 678, 792–796, 210/807, 189, 275, 283, 284

[56] References Cited

U.S. PATENT DOCUMENTS

| | | | |
|---|---|---|---|
| 3,617,558 | 11/1971 | Jones | 210/279 |
| 3,719,591 | 3/1973 | Crits | 210/283 |
| 3,960,721 | 6/1976 | Heskett | 210/283 |
| 4,260,426 | 4/1981 | Werfelman | 210/283 |
| 4,326,963 | 4/1982 | Watson et al. | 210/284 |

FOREIGN PATENT DOCUMENTS 1070596 12/1959 Fed. Rep. of Germany .
2336172 7/1977 France .

Primary Examiner—Ivars Cintins
Attorney, Agent, or Firm—Wenderoth, Lind & Ponack

[57] ABSTRACT

A method for the treatment of liquids containing particles in suspension, by percolation of the liquid from top to bottom through a bed of granular material, notably of a ion exchanger resin, includes treatment cycles of the liquid and regeneration cycles of the resin, preceded by decompaction and washing operations, carried out in the same enclosure the inner space of which is divided into two superimposed compartments in mutual communication. The lower compartment is totally filled with granular material and the upper compartment is partly filled with granular material. The decompaction and washing operations of the granular material contained in the enclosure upper compartment are carried out periodically prior to each regeneration cycle by expanding the granular material by means of a current of liquid flowing from bottom to top.

5 Claims, 1 Drawing Figure

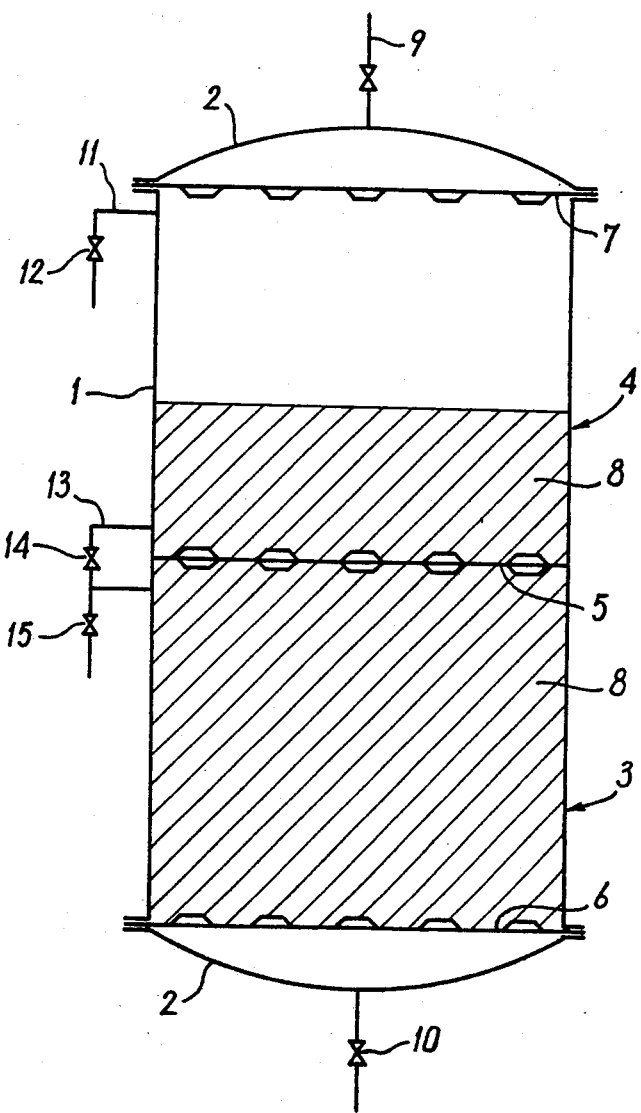

METHOD FOR THE TREATMENT OF LIQUIDS ON GRANULAR MATERIALS

FIELD OF THE INVENTION

The present invention relates to a method which improves the yield of the treatment of liquids by granular materials. The method applies to any chemical engineering operation utilizing an ion exchanger or adsorbant granular material subjected successively to an ion fixation cycle by percolation of the liquid to be treated from top to bottom through a bed of the granular material and to a regeneration cycle of the latter by an ascending current of liquid.

Such operations are currently employed, for example, in the sugar industry, in hydrometallurgy, for the treatment of industrial residual waters and more particularly for the demineralization of waters with ion exchanger resins.

BACKGROUND OF THE PRIOR ART

Many "counter-current" ion exchange methods have already been described. In such methods, the fixation of the ions on the ion exchanger granular materials and the regeneration of the granular materials are carried out by means of liquids flowing counter-current. Some operate from bottom to top for the fixation cycles and from top to bottom for the regeneration cycles. The disadvantage of such methods is that they support with difficulty the inadvertent stoppages and restarts, the layers of granular material falling back with more or less rapidity and mixing together, which is the cause of poor quality of the treated liquid.

The methods operating from top to bottom for the fixation cycles and from bottom to top for the regeneration cycles avoid this disadvantage by maintaining the layers of granular materials in a compact state.

In these methods however, the impurities present in the liquid to be treated are retained in the granular material layer, interfering with its action and increasing the load loss, and therefore, such impurities have to be periodically removed by decompaction and washing. But the decompaction and washing operations disturb the granular material layer. This disturbance is very important in the methods operating from bottom to top for the fixation cycles since impurities are dispersed over the whole height of the granular material layer, which has to be cleaned in its totality.

In the methods operating from top to bottom for the fixation cycles, the impurities are retained almost totally in the upper portion of the granular material bed acting as a filter.

The method disclosed in French patent No. 2 443 283 avoids this disadvantage by a transfer, by means of a current of liquid circulating from top to bottom, of the upper portion of the granular material bed to an appendant receptacle provided for the decompaction and washing of the granular material. However this method requires an outer column for the washing of the granular material, implying a succession of relatively lengthy operations which preferably have to be carried out only at distant intervals of time.

The present invention remedies this disadvantage by making it possible to carry out the operations of decompaction and washing of the granular material in the same receptacle in which are carried out the fixation and regeneration operations.

When practicing the methods in which the liquid to be treated circulates from top to bottom, it has been established that the impurities contained in the liquid to be treated as well as the finer resin balls concentrate in the upper layer of the ion exchanger resin bed, whereby such impurities, independently of the resin bed size, penetrate hardly further than into a layer of about 30 cm in thickness.

SUMMARY OF INVENTION

According to the invention, this layer is isolated from the granular material layer on which it is superposed, and is disposed in an upper compartment of the enclosure containing the ion exchanger resin, such enclosure being provided with a floor separating the two layers. Through this floor flows the liquid which is used for the decompaction and washing of the resin, prior to its regeneration, from bottom to top, by lifting this upper layer in the compartment which it occupies in part, advantageously between 20 and 50% of its volume.

Also according to the invention, the decompaction and washing operations of the granular material layer contained in the upper enclosure compartment are carried out periodically before each regeneration cycle by expanding the granular material by means of a current of liquid circulating from bottom to top. Thus, due to the measures adopted according to the invention, the impurities are eliminated from the upper layer of the ion exchanger resin.

Yet, little by little, fine particles of the resin and of the materials in suspension accumulate also in the granular material layer which fills the lower enclosure compartment. It is then necessary, at more or less distant intervals, to carry out a decompaction and washing operation of the upper portion of such resin layer.

According to another feature of the invention, the decompaction and washing operations of the granular material totally filling the lower compartment of the enclosure are carried out, for a predetermined degree of clogging of the granular material layer by the impurities contained in the liquid to be treated, via a hydraulic transfer of the upper portion of this granular material layer in the upper compartment by means of a pipe or equivalent structure connecting the two compartments.

According to a preferred embodiment of the invention, there is carried out a hydraulic transfer of a fraction of the granular material layer comprised between about one third and about one half of the volume of the lower enclosure compartment.

BRIEF DESCRIPTION OF DRAWING

An installation for practicing the method according to the invention is described hereafter with reference to the single schematic view of the accompanying drawing.

DETAILED DESCRIPTION OF INVENTION

The treatment enclosure is made of a cylindrical receptacle 1 closed by a domed top 2 and a domed bottom 2 and in which are carried out the fixation, regeneration and washing operations. This receptacle is divided into two compartments 3 and 4, separated by a floor 5 and defined by a lower floor 6 and an upper ceiling 7. Such floors and ceiling are for example fitted with nozzles through which pass the liquid to be treated. A mass of resin 8 is distributed into the two compartments and fills totally the lower compartment 3 between floors 5 and 6 and in part the upper compartment 4, that is, in normal operation, from 20 to 50% of the volume of compartment 4.

The liquid to be treated is introduced by pipe 9, flows successively from top to bottom across ceiling 7, the granular material layer disposed in compartment 4, the separation floor 5, the lower compartment 3 totally filled with granular material and finally floor 6. The treated liquid exits through pipe 10. During the regeneration cycle of the granular material, the reactive or reactives are injected in the reverse direction, in known manner, via pipe 10, flow through the granular material while regenerating it, and are discharged by pipe 9.

According to the invention, prior to each regeneration cycle, the resin of the lower compartment 4 is subjected to a decompaction and washing operation. The washing liquid is introduced by pipe 10, flows through the lower compartment 3 filled with resin, therefore without causing disturbances in this granular material layer, through the dividing floor 5 and expands the resin layer which is in the upper compartment 4. This layer is thus decompacted, the washing liquid entrains the impurities and exits via pipe 11 fitted with a valve 12. After washing, the resin layer of compartment 4 is recompacted by being pressed against ceiling 7 by means of a current of liquid introduced by pipe 10 and exiting via pipe 9. Then the regeneration cycle can be started.

From time to time, when the resin mass of the lower compartment 3 requires washing, and this being all the less frequent since washing of the upper compartment layer 4 is carried out prior to each regeneration, the upper portion, that is about the top third to half, of the resin layer of the lower compartment is hydraulically transferred to the upper compartment by injection from bottom to top via pipe 10 of a current of liquid entraining the resin via pipe 13 provided with valve 14, such liquid being discharged by pipe 9.

Thereby is created in the lower compartment 3 a free space allowing the lifting and washing of the remaining portion of resin 8 in compartment 3 by means of a current of liquid flowing from bottom to top, introduced by pipe 10 and exiting by pipe 13, valve 15 being open. The upper portion of the resin layer is reintroduced into compartment 3 by means of a current of liquid entering by pipe 9 and entraining the resin of compartment 4 through pipe 13, valve being 14 being open and valve 15 closed, into compartment 3 until compartment 3 is totally filled with resin.

The following example illustrates the results obtainable with this invention.

EXAMPLE

A water exhibiting the following salinity has been treated:

| calcium | 2.5 meq/l | bicarbonates | 1.5 meq/l |
|---|---|---|---|
| magnesium | 1.6 meq/l | chlorides | 0.1 meq/l |
| sodium | 1.4 meq/l | sulfates | 3.0 meq/l | that is 5.5 meq/l of cations and 4.6 meq/l of anions and containing moreover 15 mg/l of silica and 3 mg/l of material in suspension.

The treatment of this water by a counter-current standard method requires, for a cycle of 12 hours, 2300 liters of cationic resin and 2900 liters of anionic resin in two cylindrical apparatus of 1250 mm in diameter, the cation exchanger having a height of 3500 mm and the anion exchanger a height of 4800 mm. Moreover such apparatus have to be equipped with intermediate grids with plungers and with air injection or extraction devices. The frequency of the washing operations by total lifting of the resin is moreover very high.

By proceding according to the invention, only 2150 liters of cationic resin and 2700 liters of anionic resin in two cylindrical apparatus of the same diameter, 1150 mm, the cation exchanger having a height of 2700 mm and the anion exchanger a height of 3800 mm, are required.

From the foregoing, one sees that the method according to the invention allows a substantial saving as regards the quantites of resins as well as the sizes of the apparatus used, the latter being moreover of simplified construction.

We claim:

1. In a method of treatment of a liquid containing particles in suspension and ionic impurities, said method comprising percolating said liquid downwardly from top to bottom through a bed of granular ion exchange resin, thereby transferring said ionic impurities to said granular ion exchange resin and during which said particles in suspension are filtered from said liquid by an upper layer portion of said granular ion exchange resin, periodically ionically regenerating said granular ion exchange resin by passing upwardly from bottom to top through said bed of granular ion exchange resin a regeneration liquid, and periodically removing said particles in suspension from said granular ion exchange resin, the improvement comprising conducting said percolating, regenerating and removing operations within a single receptacle divided into a lower compartment entirely filled with said granular ion exchange resin and an upper compartment filled partially with an amount of said granular ion exchange resin including said upper layer portion thereof, and wherein said removing comprises:

prior to each said regenerating operation, passing a current of washing liquid upwardly from bottom to top through said receptacle and thereby through said lower compartment, without expanding or decompacting said granular ion exchange resin therein, and through said upper compartment, while expanding and decompacting said granular ion exchange resin therein, and thus removing said particles in suspension from said granular ion exchange resin in said upper compartment; and passing the thus removed particles in suspension from said receptacle.

2. The improvement claimed in claim 1, comprising filling from 20 to 50% of the volume of said upper compartment with said granular ion exchange resin.

3. The improvement claimed in claim 1, wherein eventually said granular ion exchange resin in said lower compartment becomes clogged by said particles in suspension, and further comprising periodically removing said particles in suspension from the thus clogged granular ion exchange resin in said lower compartment by hydraulically transferring an upper portion of said granular ion exchange resin in said lower compartment to said upper compartment, and then performing said operation of passing of said washing liquid upwardly through said receptacle.

4. The improvement claimed in claim 3, comprising hydraulically transferring from one third to one half of said granular ion exchange resin from said lower compartment to said upper compartment.

5. The improvement claimed in claim 3, comprising transferring said upper portion of said granular ion exchange resin from said lower compartment to said upper compartment through a pipe connecting said lower and upper compartments.

* * * * *